United States Patent [19]

Kusakabe

[11] Patent Number: 4,637,287
[45] Date of Patent: Jan. 20, 1987

[54] DIMPLELESS TUBE CUTTING APPARATUS

[75] Inventor: Mitsuo Kusakabe, Kobe, Japan

[73] Assignee: Kusakabe Electric & Machinery Co., Ltd., Japan

[21] Appl. No.: 596,437

[22] Filed: Apr. 3, 1984

[30] Foreign Application Priority Data

Apr. 26, 1983 [JP] Japan .................. 58-74700
Jul. 6, 1983 [JP] Japan .................. 58-123967

[51] Int. Cl.[4] .................. B23D 21/00; B23D 25/04
[52] U.S. Cl. .................. 83/319; 83/54; 83/456
[58] Field of Search ........ 83/319, 318, 54, 320, 83/456

[56] References Cited

U.S. PATENT DOCUMENTS

| | | | |
|---|---|---|---|
| 3,288,011 | 11/1966 | Borzym | 83/319 X |
| 3,288,012 | 11/1966 | Borzym | 83/319 X |
| 3,460,421 | 8/1969 | Borzym | 83/318 X |
| 4,109,555 | 8/1978 | Borzym | |
| 4,149,438 | 4/1979 | Hori | |
| 4,337,680 | 7/1982 | Borzym | 83/456 |
| 4,354,409 | 10/1982 | Riera et al. | 83/319 X |
| 4,361,064 | 11/1982 | Susaki | 83/319 |
| 4,376,401 | 3/1983 | Borzym | 83/319 |
| 4,499,803 | 2/1985 | Borzym et al. | 83/319 |

Primary Examiner—Donald R. Schran
Attorney, Agent, or Firm—Saidman, Sterne, Kessler & Goldstein

[57] ABSTRACT

An apparatus for use in a tube manufacturing plant wherein a coiled strip is made into a continuous tube. The tube is fed to the apparatus at a given speed and severed into a specified length with minimized errors in accordance with the contemplated use by a cutting assembly traveling in synchronism with the feed of the tube. When the speed of the cutting assembly matches the speed of the tube, a ram is lowered from above by a crank assembly to cause a notching blade and a cutoff blade to cut the tube without dimples. The ram is elongated and supported by a plurality of crankshafts which are adapted for synchronous rotation optimally by a synchronizing link. For dimpleless cutting, the notching blade is revolved and thereby moved at an increased speed to form a deep and wide notch in the tube.

9 Claims, 13 Drawing Figures

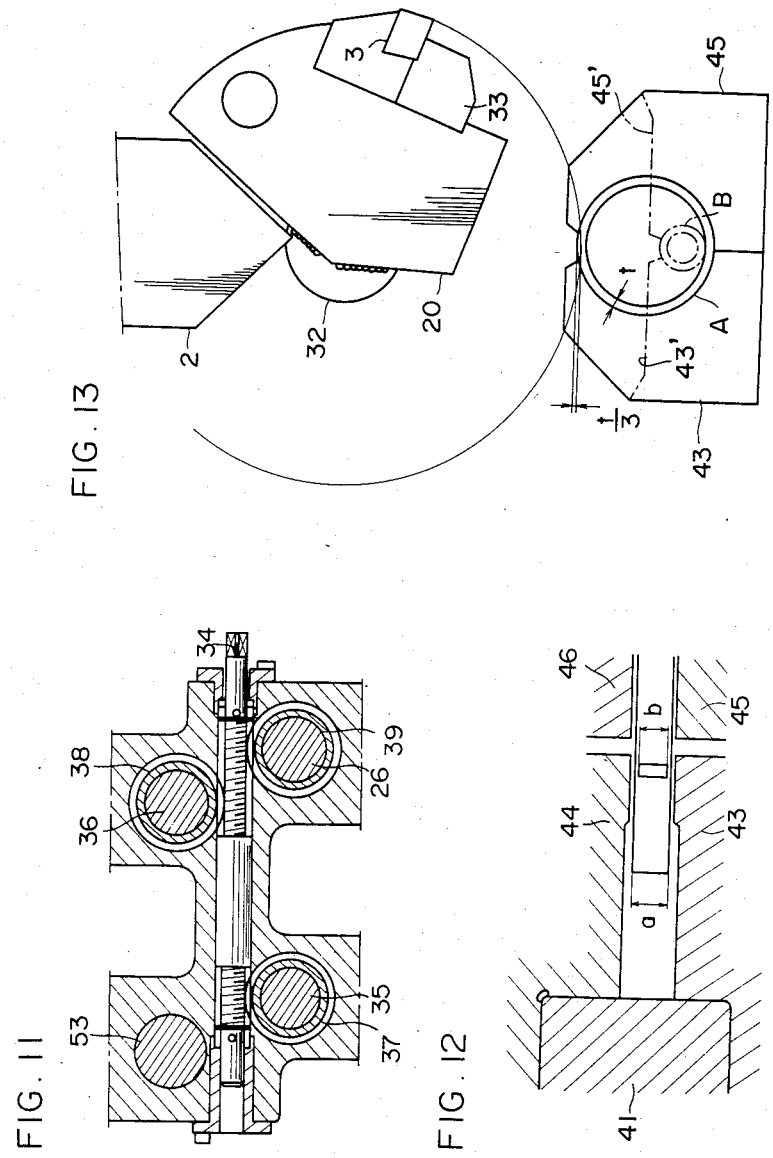

DIMPLELESS TUBE CUTTING APPARATUS

BACKGROUND OF THE INVENTION

1. Field of the Invention

The present invention relates to a dimpleless tube cutting apparatus for use in a continuous tube manufacturing plant wherein a coiled strip is made into a continuous tube, for accurately cutting the tube into desired lengths while a cutting assembly is traveling.

2. Description of the Prior Art

In a tube manufacturing plant, a coiled strip is formed into a continuous tube by a continuous operation. The continuous tube formed is cut by a traveling cutting apparatus into desired lengths with minimized errors in accordance with the contemplated use.

While such apparatus are known, for example, in U.S. Pat. No. 4,149,438, it is required to lengthen the distance of travel of a cutting assembly when it is desired to cut the tube at a higher speed with an increase in the speed of production of the tube. Accordingly there arises the need to use a longer ram-and-crank assembly for depressing the cutting assembly during travel and therefore to use more than one crankshaft. To meet this requirement, the apparatus of the present invention, although including a single drive crankshaft, is provided with follower crankshafts for suspending an elongated ram therefrom, with a cutting assembly slidably supported by the ram. When the speed of the cutting assembly, reciprocating under the control of a computer, matches the speed of the tube to be cut, the cutting assembly is positioned for the desired cutoff length, and the ram is depressed exactly at the same time.

With the tube cutting apparatus comprising such an elongated ram and a plurality of crankshafts, the follower crankshafts must be rotated in synchronism with the rotation of the drive crankshaft, so that a train of gears is conventionally interposed between the crankshafts to assure the synchronous rotation. However, the gears, which need to have strenght sufficient to withstand the impact of cutting, give an increased weight to the crankshaft rotary assembly, necessitating a great force for operating the crankshafts when initiating a cutting operation and also necessitating an increased braking force for stopping the crankshafts before the subsequent cutting operation.

SUMMARY OF THE INVENTION

An object of the present invention is to reduce the weight of the crankshaft rotary assembly by providing a synchronous link assembly in place of the train of gears for synchronizing the crankshafts so as to avoid the above objections.

Further according to the present invention, a notching blade is adapted to be revolved downward from above by the crank assembly to notch the tube before it is cut by a cutoff blade, in order to overcome the drawback experienced with conventional dimpleness cutting apparatus. For example, the apparatus disclosed in U.S. Pat. No. 4,109,555 includes a scarfing blade which is adapted for horizontal reciprocation, but the blade is unable to reciprocate quickly to form a wide and deep notch if the tube is fed at a high speed.

BRIEF DESCRIPTION OF THE DRAWINGS

FIG. 11 is a plan view in section showing a notching blade adjusting assembly;

FIG. 12 is a plan view in section showing a tube clamping assembly as positioned relative to the cutoff blade and the notching blade; and FIG. 13 is an enlarged side elevation showing the positions of die jaws, the cutoff blade and the notching blade.

DESCRIPTION OF THE PREFERRED EMBODIMENT

Figure 1:
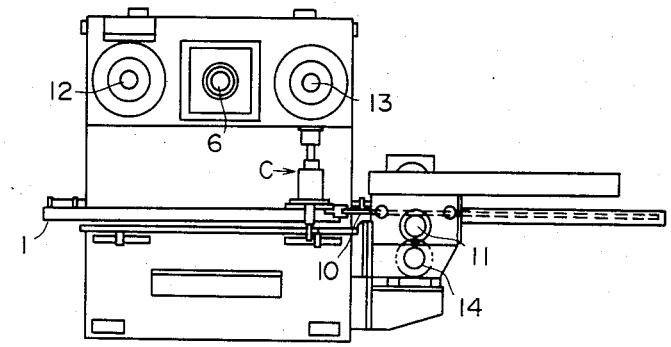
FIG. 1 is an overall front view showing a dimpleless tube cutting apparatus embodying the invention.

The overall construction of a dimpleless tube cutting apparatus will be described with reference to FIG. 1 and FIG. 2.

The apparatus includes a cutting assembly C which is slidable forward and rearward on lower rails 1 fixed to a base. While the assembly travels, a cutoff blade 2 is lowered to cut a tube A (FIGS. 6–9) or the like which is held by clamp holders and die jaws. The cutoff blade 2 is supported by an upper plate, which is slidable upward and downward relative to the clamp holders and the die jaws.

The clamp holders, die jaws, cutoff blade 2, upper plate, etc. constitute the cutting assembly C. The bottom of the cutting assembly C is fitted to the lower rails 1, while the top thereof is fitted by holding guides 22 to an upper rail 7a (FIGS. 4–5) of the ram 7 which is movable upward and downward by a crank assembly.

A drive assembly for slidingly moving the cutting assembly comprises a drive motor 14, a pinion 11, a rack 10, etc. The rack 10 is connected to the cutting assembly C.

The drive motor 14 is provided between the lower rails 1 and the frame and comprises a d.c. motor, which is controlled by a computer to instantaneously match the speed of travel of the cutting assembly with the feed speed of the tube A to be cut. The motor drives the cutting assembly in the forward or reverse direction. The amount of movement of the tube is measured by a rotary encoder. When the tube approaches the specified cutting position, the switch turns the motor on to advance the cutting assembly at a rapidly accelerated speed. The assembly is then advanced at the same speed as the tube, and the clamp holders and the die jaws clamp the tube. When the cutting assembly reaches the cutting position, a clutch 16 for the crank assembly engages to lower the cutoff blade to cut the tube. After a section of tube has been cut off, the crank assembly starts to raise the cutoff blade 2 and returns the blade to the original position, whereupon a brake 29 stops the crank assembly. After cutting, the drive motor 14 is de-energized and then reversely rotated to return the cutting assembly to the initial position. Thus the cutting assembly C is reciprocatingly moved forward and rearward on the lower rails 1 by the rack-and-pinion assembly.

In the cutting apparatus described, the present invention provides a synchronizing link for crankshafts 6, 12 and 13 which are adapted to move the ram 7 upward and downward.

Figure 2:
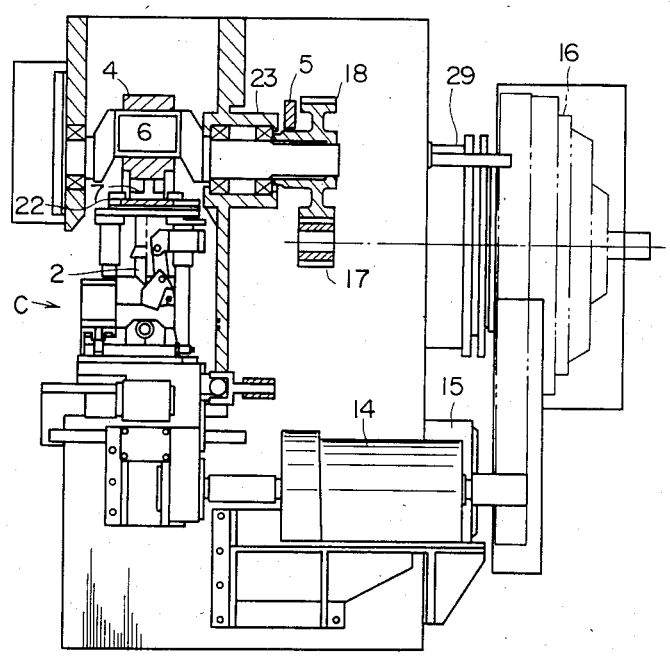
FIG. 2 is a side elevation in section showing a ram, a drive crankshaft for the ram and a cutting assembly.

With reference to FIG. 2, power is transmitted by a V belt from a pulley on a press motor 15 to an input V-pulley (not shown) disposed at one side of the clutch 16. The pulley is mounted on an input shaft which is provided with the brake 29 and a drive gear 17.

The rotation of the press motor 15 rotates the input shaft carrying the cluch 16, etc. and further rotates the drive gear 17, which in turn rotates a fixed gear 18. The drive crankshaft 6 is fixed to the gear 18. The synchronizing link 5 extends through a space on the front side of the fixed gear 18 transversely of the input shaft.

Since the cutting assembly C needs to be slidable over the entire length of the base, the ram 7 is elongated and driven by the drive crankshaft 6 disposed centrally of the base. The crankshafts 12 and 13, which are followers, are arranged on opposite sides of and in the same horizontal plane as the central crankshaft 6. The ram 7 is suspended from the three crankshafts 12, 6 and 13. Indicated at 23 is a bearing for the drive crankshaft 6, while the ram 7 is supported by bearings 4.

However, when a ram is suspended from three crankshafts and driven by only one of the crankshafts, a problem will arise unless the assembly includes a train of synchronizing gears or a synchronizing link.

Stated more specifically, when the crankpin portion of the drive crankshaft 6 begins rotation from its uppermost or lower-most positions, the torque of the crankshaft 6 directly acts to push the ram 7 rightward or leftward, giving a synchronous force to the ram to cause the ram to move in the same direction as the direction of rotation of the drive crankshaft 6. , so that the other crankshafts rotate similarly. However, when the crankpin portion of the drive shaft 6 is in a horizontal position during the rotation of the crankshaft 6, the other crankshafts 12 and 13 are permitted to begin rotation in opposite directions, which, of course, is highly undesirable.

Thus, one follower crank 13 remains free to revolve upward, whereas the other follower crank 12 remains free to revolve downward, in the reverse direction. This freedom must be eliminated by some synchronizing means for the crankshafts. Accordingly the crankshafts are conventionally provided with gears and counter gears therebetween to effect synchronism and rotate the follower crankshafts in the same direction as the drive crankshaft at all times.

However, when a train of gears is used as the synchronizing means as conventionally practiced, the gears must be given a sufficient thickness at an increased cost so as to have high strength, and the gear train adapted to withstand abrupt braking and clutching actions is heavier.

Figure 3:
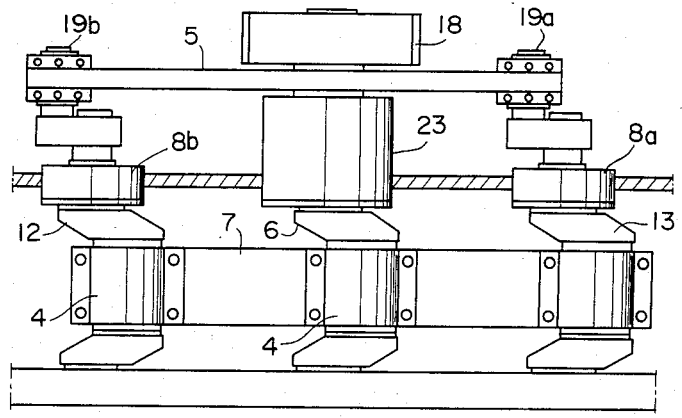
FIG. 3 is a plan view showing an arrangement of crankshafts and synchronizing link.
Figure 4:
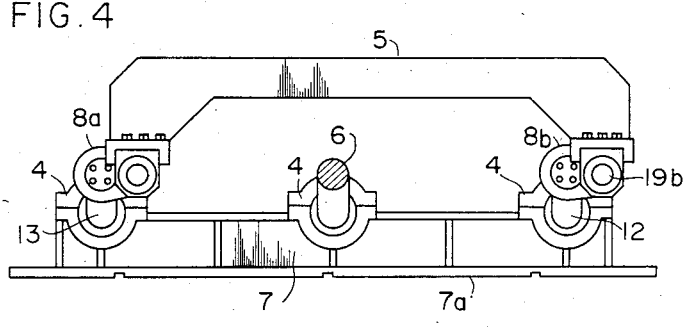
FIGS. 4 and 5 are rear views of the synchronizing assembly to show the crankshafts in rotation.
Figure 5:
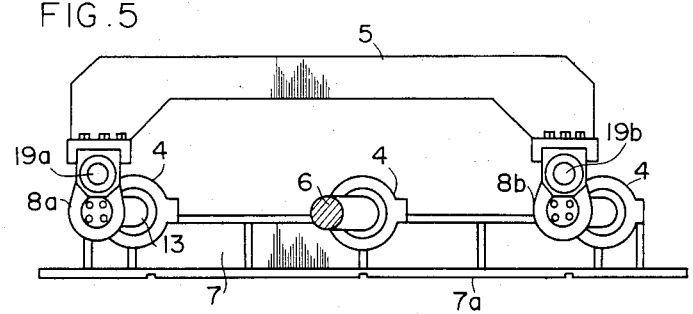

The present invention has overcome this problem. As seenin FIGS. 3 to 5, synchronizing arms 8a, 8b extend from the follower crankshafts 12, 13 at an angle with respect to the axes of the crank throws of a crankshafts 12, 13, and the synchronizing link 5 is connected to the arms 8a, 8b by connecting rods 19a, 19b. (The term "crank throws" is used here to refer to the portions of a crankshaft which in an internal combustion engine application join the main bearings to the connecting rods' "big ends"; i.e., the portions sometimes referred to as the "cranks" of the crankshaft.) The synchronizing effect, which is available to some extent when the synchronizing arms form any given angle with the axes of the crank throws of the crankshafts 12, 13, is maximized when the angle is 90°, as shown in FIGS. 4 and 5.

Figures 6, 7, 8:
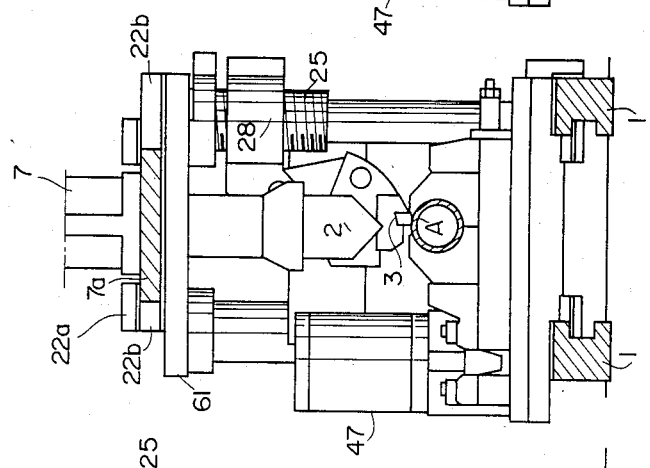
FIGS. 6, 7 and 8 are views showing a cutoff blade and a notching blade as they are moved with the descent of the ram.
Figure 10:
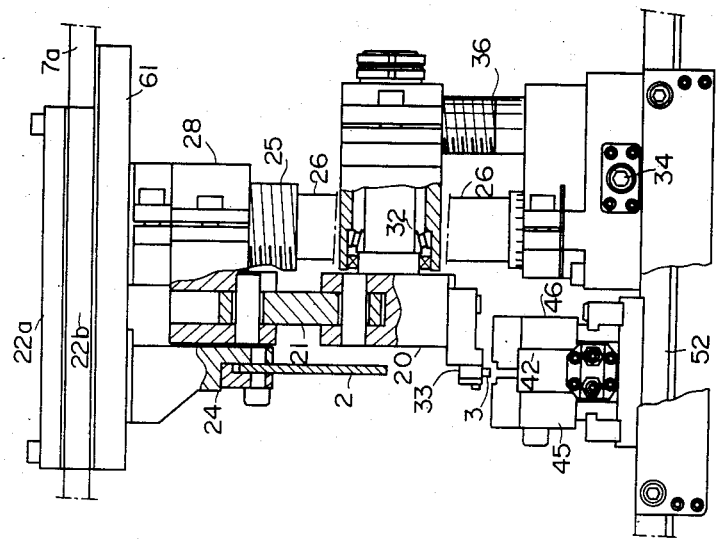
FIG. 10 is a rear view partly in section and showing the cutting assembly.
Figure 9:
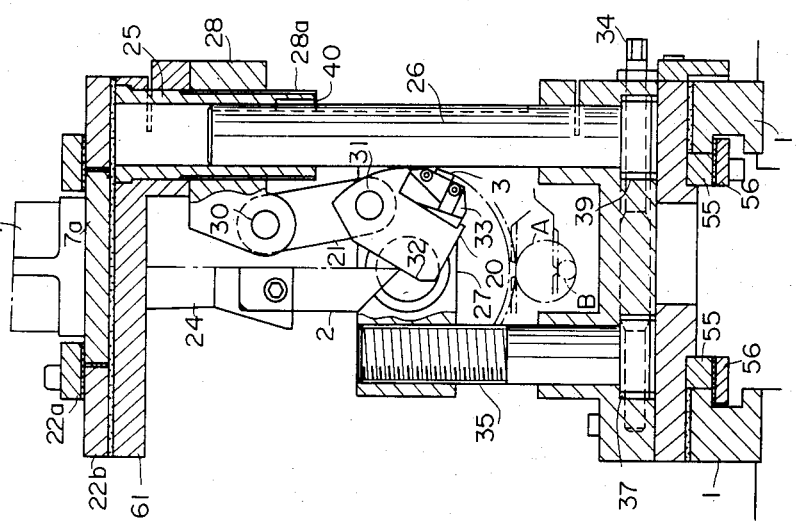
FIG. 9 is a side elevation showing the cutting assembly.

FIGS. 6 and 8 are side elevations showing the cutting assembly C of the present apparatus. It is seen that the notching blade 3 is progressively rotated and that the cutoff blade is also progressively lowered to completely cut the tube A clamped by the die jaw assembly. The notching blade 3 is rotated into contact with the tube A by rotating a crank arm 20 with a crank link 21, whereby a notch is formed in the tube A where it is to be cut by the cutoff blade 2. The upper rail 7a is lowered by the press motor 15 which is controlled by the computer, whereby the cutoff blade 2 is lowered with its tip biting into the notch formed by the notching blade 3. Subsequently the cutoff blade 2 reaches the bottom of the tube A to completely cut off a section from the tube A as shown in FIG. 8. The cutting assembly C thereafter further advances at the same speed as the tube A, and the upper rail 7a is lifted by the press motor 15 to release the cutoff blade from the cut end of the tube A. Next, the notching blade 3 is reversely revolved and returned to the original position, and the clamp holders and the die jaw assembly are released from the tube, whereupon the cutting assembly C is braked to a halt. With the cutoff blade 2 held raised, the cutting assembly C is retracted to its original position along the upper rail 7a in the lifted position.

The upper rail 7a is suspended from the rail 7, which is provided with the press motor 15. As shown in FIGS. 6 to 8, the upper rail 7a is progressively lowered with the advance of the cutting assembly C under the control of the computer. Upon completion of the tube cutting operation, the upper rail is quickly lifted in the order of the illustrations of FIG. 8 to 6 and is returned to its position shown in FIG. 6 when the cutting assembly is brought to a halt upon completion of advance. The assembly C returns along the lifted upper rail.

The upper plate 61 is provided with a lower guide member 22b extending along each side of the upper rail 7a and an upper guide member 22a provided on the member 22b and projecting over the upper rail 7a for sliding contact therewith. These guide members 22a and 22b provide each of the aforementioned holding guides 22.

The upper plate 61 is further fixedly provided with a cutoff blade holder 24, to which the cutoff blade 2 is fixed by a set plate. A sleeve 25 secured to the upper plate 61 is fitted around a guide rod 26 and is vertically slidable thereon. The upper plate 61 has another sleeve 54 fixed to a rear portion thereof and vertically slidable on a guide rod 53.

The force afforded by the press motor 15 for lowering the upper rail 7a is used for rotating the notching blade 3. An arm nut 28 is screwed on the sleeve 25 fixed to the upper plate 61 and has an arm portion, to which the crank link 21 is pivoted by a pin 30. The lower end of the crank link 21 is pivoted to the outer end of the crank arm 20 by a pin 31. The crank arm 20 is supported on a support 27 by a crankshaft 32.

Accordingly descent of the upper rail 7a rotates the crank arm 20 about the crankshaft 32 through the upper plate 61, sleeve 25, arm nut 28 and crank link 21, whereby the notching blade 3 secured to a blade holder 33 on the outer end of the crank arm 20 is rotated into contact with the upper side of the tube A to form a notch therein.

When a tube B which differs from the tube A in diameter as shown in FIG. 13 is to be cut, the position of the notching blade 3 to be rotated must be vertically adjusted accordingly. The notching blade 3 is vertically shiftable by rotating an adjusting screw 34 shown in FIG. 11 with a spanner.

Stated more specifically, the crankshaft support 27 is fixedly positioned in screw-thread engagement with adjusting screw shafts 35, 36 provided at their lower ends with adjusting pinions 37, 38, These pinions, when rotated by the adjusting screw 34, rotate the shafts 35, 36 to vertically shift the crankshaft support 27. With this adjustment, the arm nut 28 for moving the crank link 21 must also be shifted vertically at the same time by the same amount. Thus, an adjusting pinion 39 rotates the guide rod 26, thereby rotating the sleeve 25 which is vertically movably keyed as at 40 to the guide rod 26. The arm nut 28 which is fitted around the sleeve 25 in screw-thread engagement therewith as at 28a is therefore moved vertically at the same time.

The lower portion of the present apparatus will now be described. The cutting assembly C has a base frame 52 which is placed on the lower rails 1, 1 and which is provided with side plates 55, 55 and holding plates 56, 56 for holding the base frame 52 to the rails 1, 1. Where the sliding members slide on the upper rail 7a and the lower rails 1, these rails are provided with a liner for assuring smooth sliding contact. The die jaw assembly comprises four die jaws 43, 44, 45 and 46, which are fixedly positioned by bearing contact with opposed clamp holders 41, 42. When the tube A is replaced by the tube B, the die jaws 43, 45 are replaced by die jaws 43', 45'.

Indicated at 47 is a pneumatic or hydraulic cylinder for causing the die jaws to clamp the tube before the tube is cut by the notching blade 3 and the cutoff blade 2 after the speed of travel of the cutting assembly C becomes equal to the speed of feed of the tube. The die jaws are released from the clamping force after the tube is cut. The piston rod 49 of the pneumatic or hydraulic cylinder has a cam 48 which is adapted to bear against cam plates 51, 50 of the opposed clamp holders 41, 42 to force the cam plates away from each other and reduce the space between the opposed die jaws, whereby the tube A is clamped. The cam plates 50, 51 have opposed slanting cam faces to afford an increased clamping force and accommodate the possible errors involved in the outside diameter of the tube A.

To avoid dimples in the cut portion, the notching blade 3 is adapted to form a notch having a depth of about ⅓ of the wall thickness t of the tube and a width a slightly larger than the thickness b of the cutoff blade 2.

With the tube cutting apparatus of the present invention, wherein the cutoff blade is lowered to sever the tube clamped by the die jaws while the cutting assembly C is traveling at the same speed as the tube, the notching blade is adapted, before the cutoff blade reaches the tube, to notch the tube at the portion into which the cutoff blade is to bite. If the preliminary cut or notch is not formed, the portion of the tube where the cutoff blade engages is forcibly bent and dimpled, which lowers the commercial value of the product or necessitates the additional procedure of remedying the dimple or cutting off the dimpled portion. Forming the notch, according to the present invention, assures smooth biting engagement of the cutoff blade and easy cutting without dimples Further because the notching blade is adapted to notch the tube to an increased depth of about ⅓ of the wall thickness of the tube, the dimple which might otherwise be produced by the notching blade, as well as by the cutoff blade, is avoided to ensure the best mode of cutting.

Further the notch formed has a width slightly larger than the thickness of the cutoff blade and is therefore wider than those conventionally formed. This eliminates the likelihood that the cutoff blade will bite into a portion other than the notched portion, which would dimple the tube. Additionally the center of revolution of the notching blade, the crank link, the arm nut, etc. are shiftable upward or downward to adjust the position where the notching blade passes, so that when a tube of altered size is to be cut, the amount of notching is easiy adjustable to a proper value of shifting the notching blade. Accordingly tubes of different sizes can be cut easily without dimples.

Further because the notching blade of the present invention is revolved for notching by the descent of the upper plate, the notching blade can be moved at an increased circumferential speed to form a notch to a larger depth of about t/3 with a larger width than the cutoff blade. This assures dimpleless cutting. Because the crankshaft support and the arm nut are adjustable by the adjusting screw at the same time, the notching blade is adjustable easily for a change of the tube size.

What is claimed is:

1. A machine for the dimpleless cutting of tubing, comprising:
   a frame;
   a cutting assembly mounted for movement with respect to said frame together with a section of tubing to be cut;
   means for moving said cutting assembly with respect to said frame; and
   an actuator for said cutting assembly;
   said actuator for said cutting assembly comprising: a ram supported on a plurality of crankshafts, said crankshafts having their axes parallel to one another and their crank throws in phase with one another, one of said crankshafts being a driven crankshaft and the others of said crankshafts being follower crankshafts, each of said crankshafts being mounted to said frame by bearing means allowing said crankshafts to rotate about axes fixed with respect to said frame, and each of said crankshafts comprising a crank throw and a crank pin, each said follower crankshaft further comprising a synchronizing arm attached to the crank pin of said follower crankshaft and forming an angle with the throw of said follower crankshaft; and
   synchronizing link means connecting said synchronizing arms to one another, for constraining said follower crankshafts to rotate in phase with one another and with said driven crankshaft.

2. The machine of claim 1 wherein said synchronizing arms formed on said follower crankshafts form angles substantially equal to 90° with the crank throws of said follower crankshafts.

3. The machine of claim 1, wherein said means for cutting comprises a notching blade for cutting a notch in a portion of said tube and a shear blade for shearing said tube, said means for moving said shear blade to shear said tube beginning at the notch formed by said notching blade, whereby said tubing is cut without formation of a dimple.

4. The machine of claim 3, wherein the notching blade is shaped to cut a notch slightly wider than the thickness of the shear blade.

5. The machine of claim 3, further comprising means for moving said notching blade in an amount sufficient to cut a notch in said tubing to a depth of approximately one-third the wall thickness of the tubing to be cut.

6. A machine for cutting tubing, comprising a frame, a cutting assembly mounted for motion with respect to said frame, said cutting assembly comprising a notching blade, for cutting a notch in a portion of said tubing, and a shearing blade for shearing said tubing beginning in the notch formed by said notching blade, means carrying said shearing blade for reciprocating motion perpendicular to the axis of said tubing to cut the same and said notching blade is mounted for rotatory motion of an arm connected to said means carrying said shear blade, one end of said arm being pivoted about a fixed axis, and a single actuator for actuation of both said notching blade and said shear blade, said actuator comprising a plurality of crankshafts, one of said crankshafts being a powered crankshaft and the remainder of said crankshafts being follower crankshafts, each of said crankshafts being mounted for rotation about axes fixed with respect to said frame, and all of said crankshafts being constrained to rotate in phase with one another.

7. The apparatus of claim 6, wherein said notching blade is arranged to cut a notch approximately one-third the thickness of the wall thickness of said tubing.

8. The machine of claim 6, wherein said notching blade is dimensioned so as to cut a notch slightly wider than the thickness of said shear blade, whereby dimpling of said tube upon shearing thereof is avoided.

9. The machine of claim 6 further comprising synchronizing link means linking said follower crankshafts such that all of said crankshafts are constrained to rotate in phase with one another.

* * * * *